United States Patent [19]

Isogai et al.

[11] Patent Number: 5,194,973
[45] Date of Patent: Mar. 16, 1993

[54] LIQUID CRYSTAL DISPLAY DEVICE AND DISPLAY APPARATUS USING SAME

[75] Inventors: Masato Isogai, Mito; Teruo Kitamura; Katsumi Kondo, both of Katsuta; Junichi Hirakata; Shinichi Komura, both of Hitachi, all of Japan

[73] Assignee: Hitachi, Ltd., Tokyo, Japan

[21] Appl. No.: 799,275

[22] Filed: Nov. 27, 1991

[30] Foreign Application Priority Data

Nov. 29, 1990 [JP] Japan .................................. 2-332196

[51] Int. Cl.⁵ .............................................. G02F 1/13
[52] U.S. Cl. .......................................... 359/53; 359/51; 359/77; 359/93; 359/96; 353/31
[58] Field of Search ........................ 359/51, 52, 53, 77, 359/93, 96, 102; 353/35, 31

[56] References Cited

U.S. PATENT DOCUMENTS

| | | | |
|---|---|---|---|
| 4,581,608 | 4/1986 | Aftergut et al. | 359/96 |
| 4,834,508 | 5/1989 | Fergason | 359/53 |
| 4,878,741 | 11/1989 | Fergason | 359/53 |
| 5,107,352 | 4/1992 | Fergason | 359/53 |

FOREIGN PATENT DOCUMENTS

| | | |
|---|---|---|
| 0022311 | 1/1981 | European Pat. Off. |
| 0119867 | 9/1984 | European Pat. Off. |
| 0362776 | 4/1990 | European Pat. Off. |
| 47-11737 | 6/1972 | Japan |
| 58-501631 | 9/1983 | Japan |
| 59-178428 | 10/1984 | Japan |
| 59-178429 | 10/1984 | Japan |
| 60-107020 | 6/1985 | Japan |

OTHER PUBLICATIONS

Patent Abstract of Japan, JP 57005029 (Toshiko); vol. 6, No. 62, Apr. 1982.
Patent Abstract of Japan, JP 58021229 (Takashi), vol. 7, No. 96, Apr. 1983.
Patent Abstract of Japan, JP 2111921 (Yuji), vol. 14, No. 332, Jul. 1990.
Patent Abstract of Japan, JP 59013219 (Metsuo et al), vol. 8, No. 101, May, 1984.
White et al "New absorptive mode reflective liquid crystal display device" Applied physics, vol. 45, No. 11, Nov. 1974.

*Primary Examiner*—William L. Sikes
*Assistant Examiner*—Huy K. Mai
*Attorney, Agent, or Firm*—Antonelli, Terry, Stout & Kraus

[57] ABSTRACT

A liquid crystal display device characterized in comprising a set of substrates facing each other at least one of which is transparent, transparent electrodes provided respectively to each facing plane of the substrates, a light absorbing layer held between the transparent electrodes, and an electric power source for applying electric field to the light absorbing layer, and that the light absorbing layer is composed of two layers, each of the layers has dichroism, average light absorbing axis of the each layers without electric field is approximately parallel to the substrate plane and crossing each other almost orthogonally, and the average light absorbing axis of the each layers changes the axis direction by applying of electric field. In accordance with the present invention, the liquid crystal display device having eye-tireless bright display, long life time, and electric power saving character is realized.

19 Claims, 5 Drawing Sheets

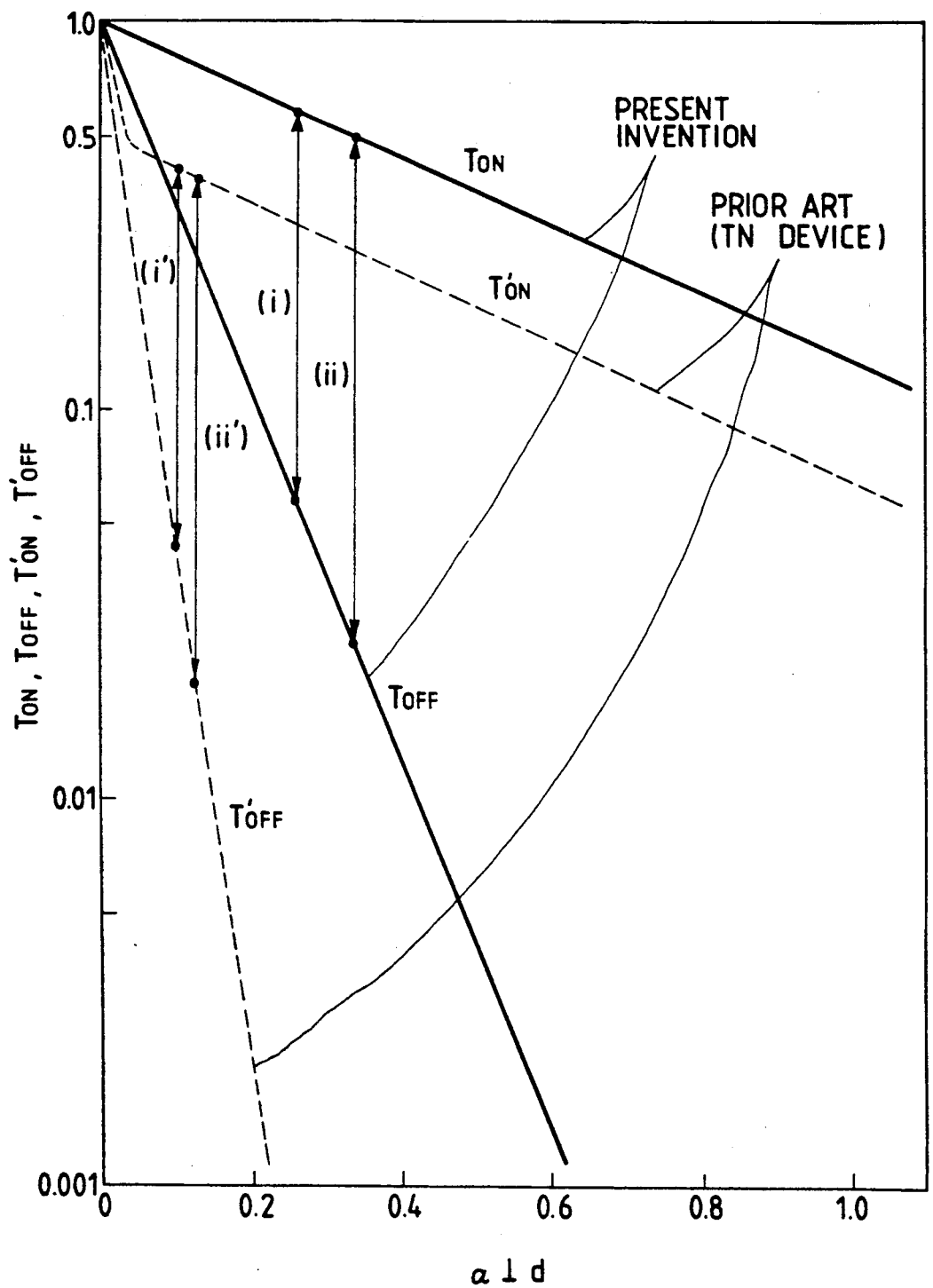

LIQUID CRYSTAL DISPLAY DEVICE AND DISPLAY APPARATUS USING SAME

BACKGROUND OF THE INVENTION

(1) Field of the Invention

The present invention relates to a display device using liquid crystals, especially to a liquid crystal display device and a display apparatus for being used in office information apparatus (OA apparatus) etc.

(2) Description of the Prior Art

Many kinds of liquid crystal display devices have been proposed and come to practical use as display devices for information display apparatus. At the present, a type using nematic liquid crystals represented by TN mode (Twisted Nematic; Refer to JP-A-47-11737) and STN mode (Super Twisted Nematic; Refer to JP-A-60-107020) is the main current and is widely used.

The TN mode and the STN mode have initial structural condition in which each of oriented direction of liquid crystal molecules is twisted approximately 90° or 260° in the cell. Incident light to the cell outgoes after being changed in polarized condition by the twisted structure of the liquid crystals and birefringence. When electric field is applied to the liquid crystal layer, the twisted structure vanishes by rearrangement of the liquid crystal molecules in direction of the electric field, and the outgoes without any change in the polarized condition. By composing a structure in which a liquid crystal cell is held between two linear polarizers, above described change (electro-optical effect) in optical property of the liquid crystal layer by application of the electrical field can be observed as change of outgoing light intensity.

With TN mode and STN mode, display contrast is obtained by the operation based on the above described principle.

The above described display device has such advantages as remarkably smaller consuming electric power than CRT (Cathode Ray Tube) display and making it possible to realize thin display panel. Accordingly, the apparatus is used widely in office information apparatus such as personal computers and word processors etc.

However, the above described display apparatus is substantially a type provided with polarizers, and the incident light is not utilized effectively. Actually, there are many cases of display in which a light source (a back light) is provided behind the liquid crystal display device for keeping brightness. A type provided with color filter (Color liquid crystal display) reduces quantity of transmitted light farther, and consequently, it needs stronger light source. Electric power consumed by the light source is equivalent to the consuming electric power of the liquid crystal panel including driving circuits, therefore, such type is not suitable for display of portable type information apparatus of which electric power is supplied from batteries. That is, brightness and lowering of consuming electric power in the conventional display device are in the so-called trade-off relation, and development of bright (high light transmittal) display device which does not need the back light is earnestly desired.

Fluorescent back light is not preferable in aspect of eye fatigue when watching the display continuously, and reflection type display is desired. Besides, the display device having high light transmittance contributes to reduction of light source size, extension of life, and electric power saving of the whole apparatus even in the case of being used as a projection type display.

In response to the above described need, a liquid crystal display device without using polarizers is proposed. The White-Taylor type guest-host cell [Refer to Journal of Applied Physics (J. Appl. Phys.) Volume 45, page 4718–4723 (1974)] is one of such display devices. Chiral nematic phase (cholesteric phase) liquid crystal is mixed with dichroic dye, and has a structure of approximate parallel configuration to the base plane. By applying electric field, the configuration of the liquid crystal changes, and consequent orientation change of the dichroic dye changes light transmittance. Owing to the twisted structure caused by the chiral nematic phase, light absorption by the dye is performed effectively, and theoretically high display contrast can be obtained without polarizers.

In the above described case, spiral pitch of the chiral nematic liquid crystal is necessarily same order of wave length of the light for realizing of high contrast. But, if the spiral pitch is shortened to that order, many disclination lines are generated and display quality becomes worse. At the same time, hysteresis occurs and response to the electric field becomes extremely slow. Accordingly, it is less practical in comparison with the TN mode and the STN mode.

Another representative display device without using polarizers is a display device called PDLC (Polymer Dispersed Liquid Crystal: Refer to JP-A-58-501631(1983)).

The above described device consists of polymer matrix in which nematic liquid crystal having positive dielectric anisotropy is dispersed as particles having diameter of a several micrometers. When refractive indexes of the liquid crystal to ordinary light and extraordinary light are represented by $n_o$ and $n_e$ respectively, and refractive index of the polymer is represented by $n_p$, combination of liquid crystal and polymer material are so selected as to be $n_p \approx n_o \neq n_e$. In the initial condition, the liquid crystals form a warped configuration structure in the particles, furthermore, difference of refractive index between most of the liquid crystal particles and the polymer matrix is induced by fluctuation in oriented direction among each of particles, consequently, the device scatters light as if it were frosted glass. When sufficient voltage is applied to the device, rearrangement of the liquid crystal molecules in the particles is induced and refractive indexes of the liquid crystal and polymer matrix to perpendicularly incident light become equal value. As the result, refraction and reflection at the boundary of the liquid crystal and polymer are almost disappeared, and the device changes to transparent state. The incident light is not necessarily linear polarized light.

As the displays based on the above described theory, polarizers are not necessary, and the incident light can be utilized effectively for obtaining bright display. But, in order to obtain sufficient display contrast, thick film having thickness of a several tens micrometers is necessary, consequently, its operating voltage becomes a several tens volts. Furthermore, as the device is dispersion type, it is preferable for the projection type display but not for the direct view type display such as OA apparatus etc.

Although a reflection type display, in which dichroic dye is mixed into nematic liquid crystal, contrived reflectors or cell construction is proposed (Refer to JP-A-59-178429 (1984) and JP-A-59-178428 (1984)), the improvement is not substantial, and it is hard to say sufficient.

SUMMARY OF THE INVENTION (1) Objects of the Invention

One of the objects of the present invention is to provide a preferable liquid crystal display device for direct view type information display of OA apparatus by improvement of the above described problems. That is, to provide the liquid crystal display device having high light transmittance at bright part, consequent high efficiency in utilization of incident light, and ability of high contrast display.

Other object of the present invention is to provide a preferable liquid crystal display device for reflection type display.

Farther, other object of the present invention is to provide a display apparatus using the above described liquid crystal display devices.

(2) Methods Solving the Problems

The gist of the present invention to achieve the above described objects is as follows:

(a) A liquid crystal display device characterized in comprising a set of substrates faced each other at least one of which is transparent, transparent electrodes provided respectively to each facing plane of said substrates, a light absorbing layer held between said transparent electrodes, and an electric power source for applying electric field to said light absorbing layer with said transparent electrodes, that said light absorbing layer is composed of two layers, each of the layers has dichroism, average light absorbing axis of the each layers without electric field is approximately parallel to the substrate plane and crossing each other almost orthogonally, and said average light absorbing axis of the each layers changes the axis direction by applying of electric field.

(b) A liquid crystal display device characterized in that one of the above described light absorbing layer is composed of polymer layer and liquid crystal, that is, nematic liquid crystal having dichroism and positive dielectric anisotropy is dispersed in transparent polymer matrix, and the other light absorbing layer is a nematic liquid crystal layer surrounded with seal members and having dichroism and positive dielectric anisotropy.

(c) A liquid crystal display device characterized in that the above described light absorbing layer is composed of two polymer layers, each of the layers is composed of nematic liquid crystal particles having dichroism and positive dielectric anisotropy dispersed in transparent polymer matrix, and said nematic liquid crystals in each of said layers are aligned approximately parallel to the plane of said substrate in a specific orientation, and the orientation of said two layers alignment are so determined as to cross each other almost orthogonally.

(d) A liquid crystal display device characterized in comprising a set of substrates faced each other at least one of which is transparent, transparent electrodes provided respectively to each facing plane of said substrates, liquid crystal alignment control layers provided on said transparent electrodes, two liquid crystal layers separated by a polymer layer and held between said set of substrates, and seal portions surrounding vicinity of said liquid crystal layer, that said liquid crystal layer is nematic liquid crystal having dichroism and positive dielectric anisotropy, said nematic liquid crystal is approximately parallel to the substrate plane and is aligned to a designated orientation, and the orientation of alignment in said two layers of liquid crystal layers are crossing each other almost orthogonally.

In case of the composition of above described (b) and (c), it is preferable that a relative equation, $n_o \leq n_p \leq n_e$, is established among the refractive indexes of the nematic liquid crystal to ordinary light, $n_o$, and to extraordinary light, $n_e$, and the refractive index of the polymer matrix, $n_p$, and ideally $n_o = n_p = n_e$ is preferable.

The difference between the above described two refractive indexes, $n_o$ and $n_e$, of the nematic liquid crystal, namely, refractive index anisotropy $\Delta n$ ($= n_e - n_o$), is necessary to be at most 0.1. The dielectric constant $\epsilon_{II}$ (dielectric constant of the liquid crystal in longitudinal direction) of the nematic liquid crystal is preferable to be approximately equal to the dielectric constant of the polymer matrix material, $\epsilon_p$, and large dielectric constant anisotropy, $\Delta\epsilon$ ($=\epsilon_{II} - \epsilon_\perp$), as possible is preferable for low voltage operation.

In case of the composition of the above described (d), preferable alignment of the two liquid crystal layers are obtained by forming the liquid crystal configuration control layers on both plane sides of the polymer layer, crossing each other of the direction of orientation on the plane sides almost orthogonally, and coinciding with the direction of orientation formed on the liquid crystal alignment control layer of the opposite side beyond the liquid crystal layer.

Also, same preferable configuration of the two liquid crystal layers are obtained by making the polymer layer have two layers structure composed of uniaxially stretched polymer material, making the stretching direction of polymer material of the two layers cross over almost orthogonally each other and coincide with the direction of oriented configuration formed on the liquid crystal alignment control layer of the opposite side beyond the liquid crystal layer.

The above described two liquid crystal layers preferably have almost same thickness, and thickness of the second polymer layer is preferably at most ten times of the thickness of the liquid crystal layer. If the thickness is larger than ten times, driving voltage increases remarkably. In order to control the thickness of the liquid crystal layer, spacer having a designated size is mixed into the liquid crystal layer and the seal portion, and the thickness of the liquid crystal layer is so controlled as to be uniform all through the panel.

As for the nematic liquid crystal, the one having small refractive index anisotropy is selected from liquid crystals prepared for the liquid crystal display of the TN type device and the STN type device at the present, and is used. For instance, liquid crystal composition including chemical compounds expressed by the following general formula as a main component:

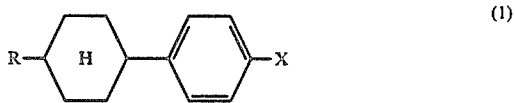

(1)

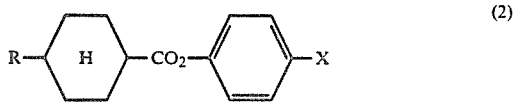

(2)

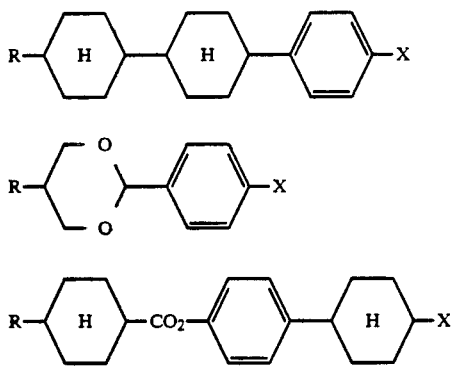

(where, X is any of —CN, —F, —OR, —OCF)

As for commercial liquid crystal composition, for instance, the following is available;

Made by MERCK Co.: ZLI-1800-000, ZLI-3561-000,
Made by Rodwick Co.: RDX-4068, EPX-006.

As for the dichroic dye used for the present invention, it is necessary to solve well in the nematic liquid crystal, and to align in accordance with the orientation of the liquid crystal molecules, that is, to have so-called guest-host effect.

Dichroic ratio which represents extent of the orientation is preferably at least 10 at the maximum absorbing wave length of the light. As for such materials, the following chemical compounds are known:

Anthraquinone group, azo group, quinophthalone group, perylene group, azomethyne group etc. Representative examples of the groups are shown in Table 1.

As for commercial dichroic dye, for instance, the following is available;

Made by Mitsubishi Chemicals Co.: LSY-116, LSR-401, LSB-335.

The mixing dye is not necessarily single component. Rather, in order to obtain maximum display contrast, three or four kinds of dyes are generally mixed into the liquid crystal for darkening. In this case, as for the dyes, the materials which have absorbing characteristics corresponding to each of three primary colors (substractive) of light are selected.

The above described dye may be used by mixing with appropriate fraction, or by using commercial product in which the dye is previously mixed with the nematic liquid crystal (for instance, made by Mitsubishi Chemicals Co.: LHA-031B, LHA-041B etc.).

In accordance with the present invention, it is necessary that the polymer matrix material is the material having mutual solubility with the nematic liquid crystal, matching in refractive index and dielectric constant, and controllability of orientation of the nematic liquid crystal molecules at the initial condition.

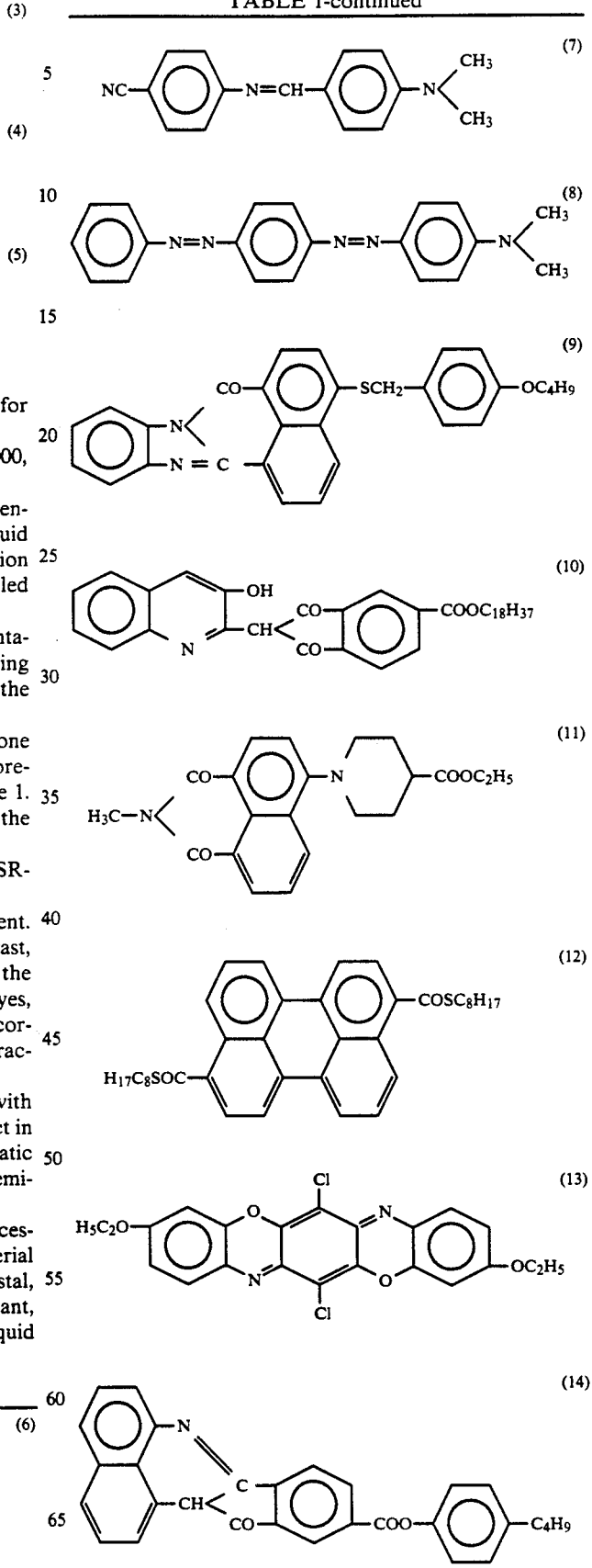

TABLE 1-continued

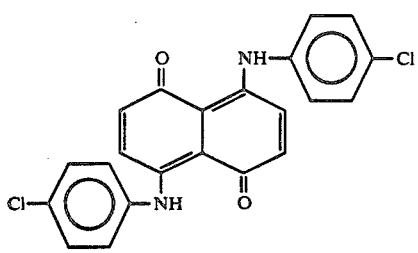
(15)

The configuration of nematic liquid crystal in the polymer layer can be achieved by stretching of the polymer or using liquid crystal line polymer as the polymer matrix material. Preferable materials are, for instance, polymer materials having single component such as polyvinyl alcohol, polyethylene, polyacryl, and polypropylene, etc., co-polymers such as methacrylates/acrylonitrile, and vinylidene chloride/acrylonitrile etc., and main chain type polymer liquid crystal material such as polyester group and polysiloxane group etc.

As for the polymer layer material in the composition example of above described (d), polyethylene terephthalate film is preferable.

As for liquid crystal alignment control layer, material which is used for conventional TN type liquid crystal alignment control such as polyimide and polyamide etc. can be used.

Next, the operation theory of the present invention is explained referring to drawings.

FIG. 1 shows the first fundamental composition of the present invention, and one of the embodiments.

A polymer layer is held between the transparent substrates 1A, 1B on which the transparent electrodes 2A, 2B are formed in a desired pattern. The polymer layer has two layers structure, each of which is a polymer matrix 3A, 3B in which the nematic liquid crystal 4A1, 4A2, 4B1, 4B2 containing adequate quantity of dichroic dye are dispersed grainwise. Longitudinal direction of the liquid crystal molecule, accordingly, direction of light absorbing axis of the mixed dichroic dye is approximately parallel to the substrate plane in the condition with no electric field. The two layers are so combined that the orientation of the liquid crystal particles 4A1 in the first layer and the orientation of the liquid crystal particles 4B1 in the second layer cross over almost orthogonally.

When white natural light 81 emitted from the light source 7 is incident to the polymer layers, the light of which wave length is in the absorbing wave length band of the dichroic dye is not able to transmit through the polymer layer because the light component polarized vertical to the drawing sheet is absorbed at the first layer and the light component polarized horizontal direction is absorbed at the second layer. As the result, the polymer layers are colored brightly. By mixing a several kinds of dyes in order to absorb almost whole region of visible light, the light from the light source is hardly able to transmit, and the polymer layers become dark state (black).

When sufficient electric field is applied to the polymer layers with the operation power source 5 through the connecting wire 6, the liquid crystal molecules having positive dielectric anisotropy induce the configuration change, and the longitudinal axis of the liquid crystal molecules are arranged to direction of the electric field. At the same time, the absorbing axes of the dichroic dye 4A2, 4B2, in the liquid crystal particles are oriented to the direction of the electric field, consequently, vibration direction of the light 82 from the light source becomes orthogonal to the absorbing axis of the dye, and almost of the light transmit through without being absorbed.

In order to obtain a transparency of the part where the electric field is applied, it is necessary to control the refraction of the light at the boundary between the liquid crystal particle and the polymer matrix, and the scattering by reflection as possible. It is realized by getting the refractive index of the liquid crystal to ordinary light, $n_o$, and the refractive index of the polymer matrix, $n_p$, to be approximately same. Further, in order to avoid muddying of the colored part where non-electric field is applied, materials are so selected that the refractive index of the liquid crystal to the extraordinary light, $n_e$, becomes almost same as the $n_p$ because the display with good image quality also can be realized by the decreasing the scattering. That is, on the contrary to the scattering type, the liquid crystal having as small refractive index anisotropy as possible is preferable.

The particle size of the liquid crystal also effects the display quality. If the particle size is too small, a plenty of liquid crystal particles get into the light path, and, as the result, the quantity of the scattered light is increased. On the contrary, if the particle size is too large, cases in which the light does not transmit through the liquid crystal are generated, and lowering of the contrast and lack of display uniformity may be caused. The particle size of approximately 1~10 μm is preferable.

The optimum thickness of the polymer layer is also necessarily selected by the same reason. If the thickness is too thin, preferable contrast can not be obtained, and, if too thick, not only the transparency is inferior but also the operation voltage becomes high. The thickness of about 5~30 μm is practical.

Next, display contrast of an ideal case in the above composition, namely, $n_o=n_p=n_e$, is described.

For simplification, the thickness of the first layer and the second layer of the polymer layers $d_1$ and $d_2$ are assumed same ($d_1=d_2=d$). The absorbing coefficient of the dichroic dye to the light polarized parallel and vertical to the oriented direction of the liquid crystal with wave length λ are assumed as $α\|(λ)$ and $α\bot(λ)$. Ordinary material having large guest-host effect has dichroic ratio $[≡α\|(λ)/α\bot(λ)]$ of about ten. In this case, the explanation is performed with assuming R=10.

Assuming that the light transmits through the liquid crystal particle in the average distance of $d_{L1}$ and $d_{L2}$, and that, for simplification, there is no difference in the transmitting distance between the first layer and the second layer ($d_{L1}=d_{L2}=d_L$). As describes later, the $d_L$ is almost a half of the d.

With the above described assumption, the light transmittance under the electric field and the non-electric field, $T_{ON}$ and $T_{OFF}$, are expressed by the following equations:

$$T_{ON}=\int y(λ)exp[-2α\bot(λ)d_L]dλ/\int y(λ)dλ \quad (1)$$

$$T_{OFF}=\int y(λ)exp[-[α\|(λ)+α\bot(λ)]·d_L]dλ/\int y(λ)dλ \quad (2)$$

where, y(λ) is a function corresponding to the visibility of human being, and the integration is performed whole wave length region. Supposing that the absorbing region is spread over whole visible region and the absorbing coefficient of the dye is constant independent of wave length, $T_{ON}$ and $T_{OFF}$ can be expressed as the following equations.

$$T_{ON} = exp[-2\alpha\perp(\lambda)d_L] \quad (3)$$

$$T_{OFF} = exp[-[\alpha_1(\lambda)+\alpha\perp(\lambda)]\cdot d_L] \quad (4)$$

The above described equations (3) and (4) are depicted in FIG. 2. The horizontal axis expresses absorbance proportional to the additive quantity of the dye, and the vertical axis expresses the transmittance. In FIG. 2, the transmittance characteristics of the conventional TN device is shown as the reference.

A kind of dichroic dye is contained in conventional polarizers. It is made by stretching of polymer containing dichroic dye, and the dichroic ratio is about 30. In FIG. 2, the characteristics of the device relating to the present invention is expressed by solid line, and the characteristics of the conventional TN device is expressed by dashed line. The dichroic ratio are assumed as above described 10 and 30 respectively. In the FIG. 2, (i) and (ii) express the location where the display contrast become 10 and 20 respectively, and addition of ' means the TN device.

As shown in FIG. 2, the composition of the present invention has higher contrast in any cases of the transmittance in bright condition, and bright display is realized. The reason is that the dye is arranged parallel to the incident direction of the light and, accordingly, the light is not absorbed by any layers as the equation (3) reveals. In the case of the TN device, the bright state corresponds to the condition in which two polarizers are arranged in the same direction, and a half of the light is absorbed by the dye faces perpendicular to the incident light.

The feature of the present invention is making two layer structure of liquid crystals by holding it in polymer matrix or by any other means, the liquid crystal in each layers is oriented parallel to the substrate in a specified direction, and the direction in two layers are so arranged as to cross over each other orthogonally.

The above described liquid crystal particles are not necessarily spherical nor isolated, and may be connected each other.

In accordance with the composition of the present invention as above described as (d), the liquid crystal layer is separated by a transparent polymer layer having almost same thickness as the liquid crystal layer at the middle of the device. The theory of the display is as same as the case in which the liquid crystal particles are dispersed in the polymer matrix. Further, although it is necessary to consider the combination of materials for the purpose of avoiding the light scattering in case of the system where the liquid crystal particles are dispersed in polymer matrix, it is not necessary in the present structure.

As explained above, the device structure of the present invention makes it possible to provide the liquid crystal display device having large light transmittance at the bright area, accordingly, ability to use incident light effectively, and high display contrast.

BRIEF DESCRIPTION OF THE DRAWINGS

FIG. 2 is a graph of the characteristics showing the feature of the present invention.

FIG. 10 (B) is the cross section of ab section of FIG. 10 (A).

DETAILED DESCRIPTION OF THE EMBODIMENTS

The embodiments of the present invention are explained in the following referring to FIG. 1, and FIGS. 3-10.

The composition of the first embodiment of the present invention is as described in the previous article.

Uniform alignment of liquid crystal molecules is obtained by, after preparing polymer film having dispersed liquid crystal 4A1, 4A2, 4B1 and 4B2 by the method described later, stretching of the polymer film uniaxially. The obtained two stretched films are so adhered together that the stretched directions cross over each other orthogonally.

Figure 3:
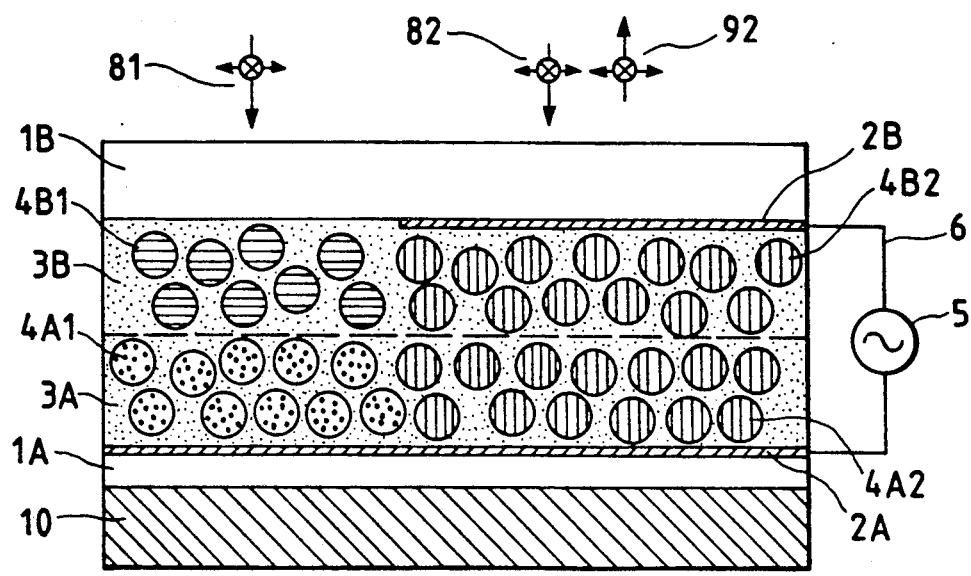
FIGS. 3, 4, 5, 7, and 8 are schematic cross sections of the devices relating to the other embodiments of the present invention.
Figure 4:
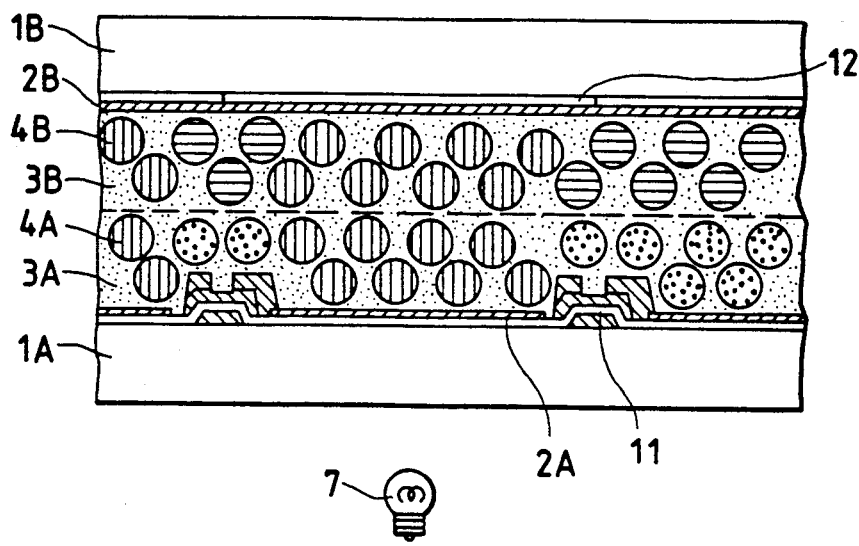
Figure 5:
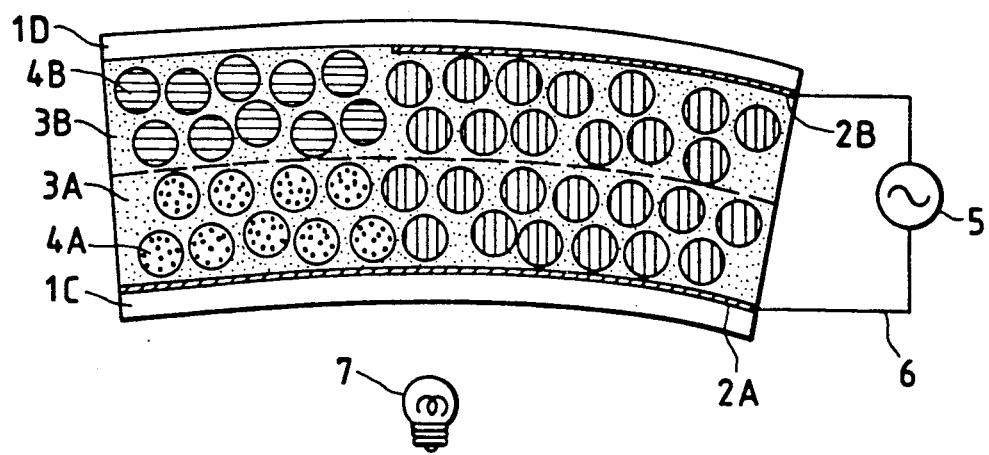

The other embodiments of the present invention are shown in FIGS. 3, 4, and 5.

FIG. 3 shows state of a reflection type device without back-light, FIG. 4 shows state of operating by TFT (Thin Film Transistor), and FIG. 5 shows state of a flexible display device. In accordance with the operation principle of the present invention, sufficient brightness is ensured even as a reflection type device. As the device has the structure in which the liquid crystal is dispersed in the polymer matrix, the substrate is substantially not necessarily required although thin protection layer for ensuring of reliability should be necessary. In FIG. 3, the substrate 1A in the side where the reflector 10 is located can be replaced with the protection layer having thickness of tens μm, and the replacement makes it possible to eliminate display shadow which exists in ordinary liquid crystal display. As shown in FIG. 4, using the substrate 1A on which TFT 11 is formed in a matrix makes it possible to realize the very fine display. Full color display can be realized by the structure in which the color filter 12 for the three primary colors is arranged on the other side substrate 1B in the pattern matching with the TFT matrix, and dichroic dye for mixing with the liquid crystal 4A and 4B is prepared so as to absorb the light in whole visible region.

As described in the example of the reflection type composition, the liquid crystal device of the present invention does not necessarily require the substrate. As shown in FIG. 5, the flexible display device is obtained by forming the transparent electrode directly on the polymer layer, and forming the protection layers 1C and 1D outside. As the device is flexible, it is possible to make it have curved surface, and remarkable reduction in weight of the display module is realized because it does not have the substrate (ordinarily glass is used).

Figure 6:
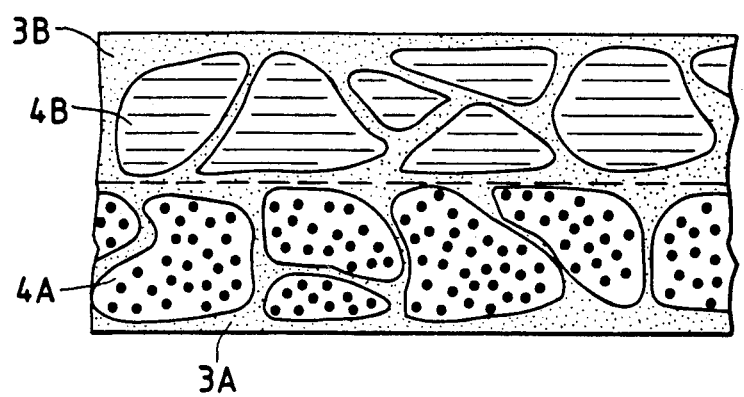
FIG. 6 is a schematic cross section to illustrate state of the polymer layer of the present invention.

The embodiment having different structure of the polymer layer is shown in FIG. 6.

In FIG. 6, only the polymer layer in FIGS. 1, 3, 4, and 5 is shown, and the state in which the liquid crystal 4A, 4B are taken into the polymer matrix 3A, 3B having net structure is illustrated. Mutual liquid crystals are connected in the 3A and the 3B, but two layers of top and bottom are separated. As the operation principle is previously described, the device is so composed that the liquid crystals 4A, 4B containing dichroic dye having guest-host effect are oriented parallel in a specified direction in the top layer and the bottom layer respectively, and the oriented direction is so specified as to cross over each other orthogonally. By composing as above described, the device has the feature to be operable by lower voltage power than the embodiment shown in FIG. 1.

Figure 7:
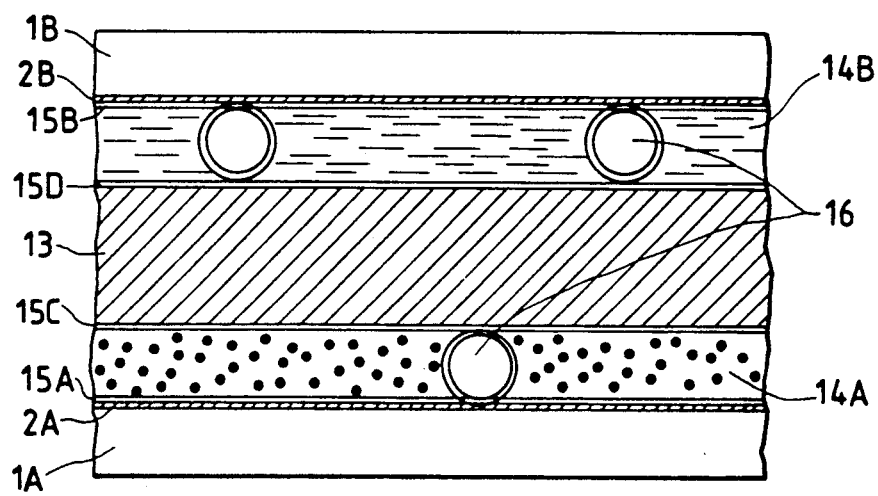

FIG. 7 illustrates the embodiment of the composition of the previously described (d) relating to the present invention. The liquid crystals 14A, 14B containing dichroic dye having guest-host effect is separated into two layer by the transparent polymer layer 13. The polymer layers 15A, 15B, 15C, 15D for controlling the liquid crystal alignment are formed on the transparent substrates 1A, 1B whereon the transparent electrodes 2A, 2B for applying the operational electric field are formed and both sides of the polymer layer 13, The direction of the alignment are, as previously described, approximately parallel between 15A and 15C, 15B and 15D, and 15A and 15C cross over 15B and 15D almost orthogonally each other.

Thickness of the liquid crystal layers 14A, 14B are approximately same, and the thickness of the polymer layer 13 is preferably thinner than the thickness of the liquid crystal layers 14A, 14B as possible. But, requirement of physical strength for the layer prevent it from extreme thinning. A several micrometers for the thickness of the liquid crystal layers, 14A, 14B, and tens micrometers for the thickness of the polymer layer 13 are practical. In order to control the thickness of the liquid crystal layers 14A, 14B uniform, the device is composed with the liquid crystal in which glass fiber, polymer beads, or silica beads etc. are dispersed.

Figure 1:
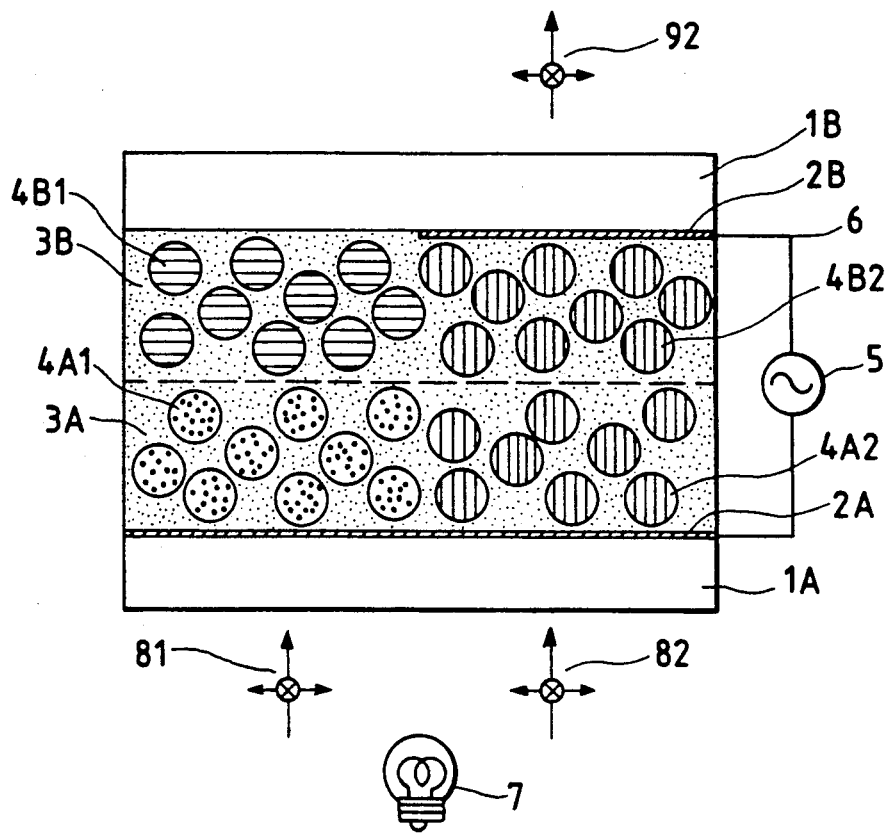
FIG. 1 is a schematic cross section of the device relating to one of the embodiments of the present invention.

In accordance with the composition of the present embodiment, irregular light scattering is not generated, and more preferable display to the composition shown in FIG. 1 is possible. Application to the reflection type as shown in FIGS. 3 and 4, and TFT matrix operation type is naturally possible.

By making the substrates 1A, 1B flexible transparent polymer, the flexible display device as shown in FIG. 5 can be obtained.

That is, in accordance with the present embodiment, the liquid crystal display device having large light transmittance at bright state, ability to display with high contrast, and preferable display quality without muddying in colored state can be provided.

Figure 8:
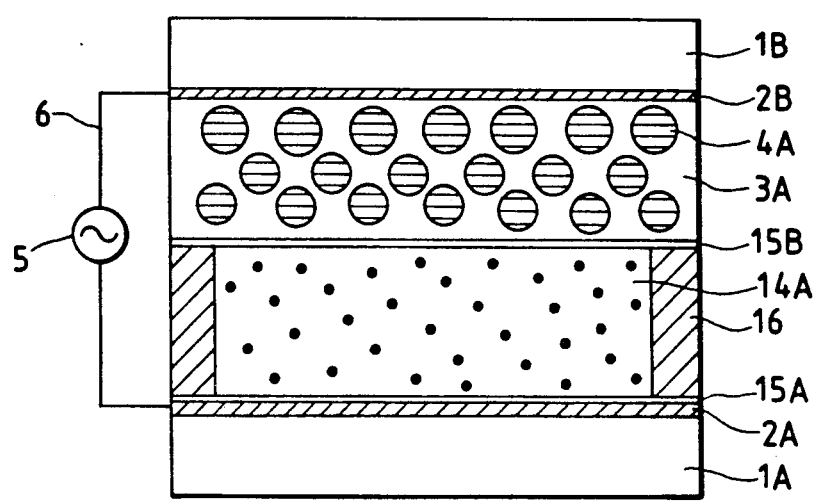

FIG. 8 illustrates the embodiment of the composition of the previously described (b) relating to the present invention.

The device in which one of the light absorbing layers (the first layer) is composed of the uniaxially stretched polymer material 3A containing dichroic nematic liquid crystal particles 4A, and the other layer (the second layer) is the dichroic nematic liquid crystal layer 14A is illustrated. In the device, both the stretched direction of the first polymer layer and the oriented direction of the liquid crystal in the second liquid crystal layer are parallel to the substrate, and polymer alignment control layers 15A, 15B are so formed on the polymer material 3A and the side contacting with the second layer of the light absorbing layer of the transparent electrode 2A that the oriented direction of the liquid crystal in the two layers mutually crosses over almost orthogonally.

As the liquid crystal layer is used for the second layer in the device, light absorption under no electric field is large, consequently, the thickness of the second layer can be made relatively thinner than that of the first layer (about ½).

Figure 9:
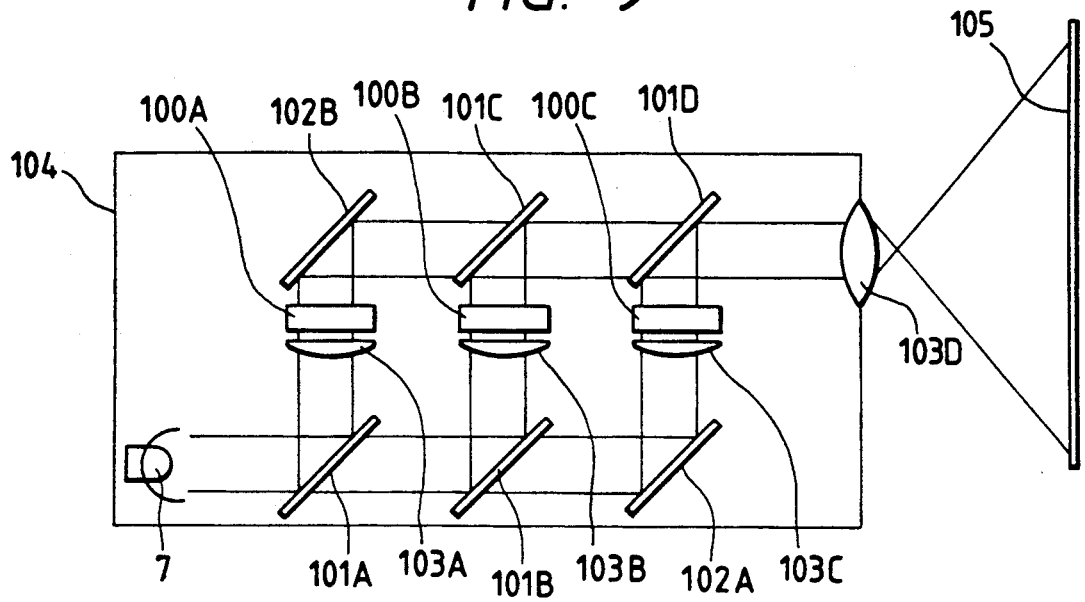
FIG. 9 is a schematic illustration showing fundamental composition of a projection type display apparatus.

FIG. 9 illustrates the embodiment of projection type display apparatus using the display device relating to the present invention.

The outgoing light from the white light source 7 is divided into three primary colors of red (R), green (G), and blue (B) by passing through the dichroic mirror 101A, 101B. The divided light forms images by passing through the liquid crystal cells 100A, 100B, 100C corresponding to each of the colors, and projected on the screen 105 by the optical system composed of the mirror 102B, the dichroic mirror 101C, 101D, and the lens 103D. In the above described case, the light absorbing layers 100A, 100B, 100C of the liquid crystal cell are indispensable and sufficient in having light absorbing spectrum corresponding to the three colors. That is, by preparation of each liquid crystal cell in such manner that the dye which absorbs R light for the R, and the dye which absorbs G light for the G, and so on, the bright projection type display apparatus can be obtained. Further, when the quantity of projection light is same as that of the conventional apparatus, less emission from the light source is sufficient in this system, consequently, life of the light source can be extended.

Figure 10A:
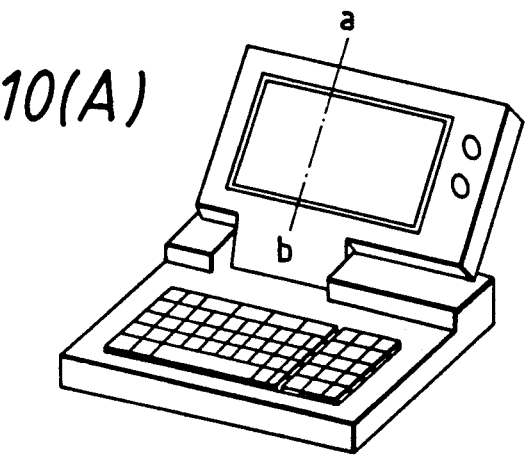
FIG. 10 (A) is an outside view of a display apparatus for OA apparatus.
Figure 10B:
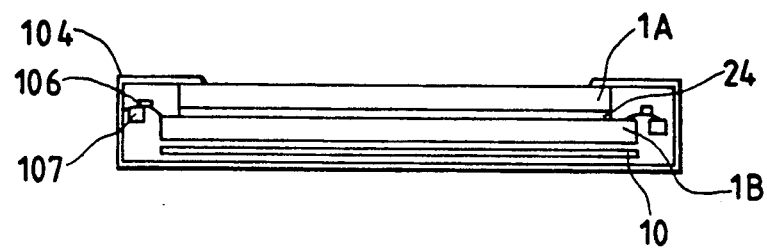

FIG. 10 illustrates other embodiment of the display apparatus using the display device relating to the present invention.

FIG. 10 (A) illustrates outside view of the apparatus, and FIG. 10 (B) is a schematic cross section of the ab section of the display. As are illustrated in FIGS. 10 (A), and (B), the OA apparatus having sufficient display capacity can be provided in spite of the structure has no back light because of the high light transmittance, consequently, electric power saving is achieved.

Next, concrete examples of the liquid crystal display device are explained.

Embodiment 1

Ten grams of 10% aqueous solution of polyvinyl alcohol having polymerization degree of about 500 and 6 grams of the liquid crystal composition which was 3% mixture of dichroic dye LSB-335 (made by Mitsubishi Chemicals Co.) in nematic liquid crystal ZLI-3561-000 (made by Merck Co.) were mixed and emulsified in a beaker by a homomixer rotating 10,000 rpm for 10 minutes.

Next, 27 grams (7 grams of resin component) of latex, namely, the co-polymer of methyl methacrylate, butyl acrylate and acrylonitrile, was added and mixed by the homomixer. Stood still for about one hour for waiting of foam decrease. After taking out the mixture onto a glass plate by a syringe, the mixture was spread to film having thickness of about 100 $\mu$m by a squeegee, and dried at 60° C. for one hour.

Next, the film was stripped off from the glass plate with a knife, and the film having thickness of 30 $\mu$m was obtained. The film was heated again at 80° C., and was stretched uniaxially to almost 3 times. Two sheets of the stretched film were so put together that the stretched direction crossed over orthogonally after ethyl alcohol was sprayed, and adhered together by pressing with a rubber roller. The above described film was held between two sheets of glass substrate having ITO (Indium Tin Oxide) transparent electrode after spraying ethyl alcohol on the substrate, and the device was obtained by adhering together with pressure using a press.

Embodiment 2

As same as the embodiment 1, ten grams of 10% aqueous solution of polyvinyl alcohol having polymerization degree of about 500 and 6 grams of the liquid crystal composition which was 3% mixture of dichroic dye LSB-335 (made by Mitsubishi Chemicals Co.) in nematic liquid crystal ZLI-3561-000 (made by Merck Co.) were mixed and emulsified in a beaker by a homomixer rotating 10,000 rpm for 10 minutes. After waited for decreasing of foams, the mixture was spread over co-polymer film having thickness of 30 $\mu$m of equivalent weight ratio of butyl acrylate and methyl methacrylate by the same method as the embodiment 1. The thickness of the polymer layer formed on the film was 50 $\mu$m. The film was stretched uniaxially to almost 3 times at 100° C., two sheets of the stretched film were so put together that the stretched direction crossed over orthogonally after ethyl alcohol was sprayed, and adhered together by pressing with a rubber roller. The above described film was held between two sheets of glass substrate having ITO (Indium Tin Oxide) transparent electrode after spraying ethyl alcohol on the substrate, and the device was obtained by adhering together with pressure using a press.

Embodiment 3

A liquid crystal composition was prepared, in which 1, 4-bis-[p-(6-acryloxyhexane-1-oxy)phenylcarboxy]-benzene and liquid crystal composition which was a mixture of 3% by weight of dichroic dye LSB-335 in nematic liquid crystal ZLI-3561-000 were mixed in a ratio of 30% by weight:70% by weight, further, $\alpha$, $\alpha$-dimethoxydioxybenzoin was added by 0.5% by weight as photopolymerization initiator. On two sheets each of glass substrate having ITO transparent electrode and ordinary glass plate, 3% by weight solution of PIQ (made by Hitachi Chemical Co.) in NMP (N-Methylpyrolidone) was coated rotationally (3,000 rpm/minute), and after baked at 250° C. for one hour, polymer film for liquid crystal alignment control was prepared by rubbing of the film in a direction using buffs. Polyethylene terephthalate film, of which central portion was punched off for containing of the above described liquid crystal composition, of 9 $\mu$m thick was placed as a spacer on the glass substrate having the electrode. After supplying a few drops of the above described liquid crystal composition onto the central part of the substrate with a filler, the above described glass plate was so combined with the substrate that the direction of the rubbing became parallel. Two of the elements were prepared, and each of the elements was polymerized by irradiation of ultraviolet light from a 100 W high voltage mercury lamp for 10 minutes.

After stripping off the glass plate having no electrode by a knife, the two elements were so combined that the rubbing direction of each element crossed over orthogonally, and the device was obtained by adhering the two elements together with pressing.

Embodiment 4

A liquid crystal composition was prepared, in which polyethylene glycol diacrylate (number of ethylene oxide=4) and dichroic nematic liquid crystal LHA-031B (made by Mitsubishi Chemicals Co.) were mixed in a ratio of 40% by weight:60% by weight, further, $\alpha$, $\alpha$-dimethoxydioxybenzoin was added by 0.5% by weight as photopolymerization initiator.

A glass substrate as washed was prepared, and polyethylene terephthalate film, of which central part was punched off for containing of the above described composition, of 50 $\mu$m thick was placed as a spacer on the glass substrate. After supplying a few drops of the above described composition onto the central portion of the glass substrate with a filler, another glass plate was combined with the glass substrate.

Two of the elements were prepared, and each of the elements was polymerized by irradiation of ultraviolet light from a 100 W high voltage mercury lamp for 10 minutes. By stripping off the glass plate with a knife, two polymer films of about 50 $\mu$m thick were obtained. Each of the films was stretched to three times in a direction at 100° C., and the two films were so combined that the each direction of the stretching crossed over orthogonally after spraying of polyethylene glycol diacrylate, subsequently, the two films were adhered together by pressing. The adhered film was held between two glass substrates having ITO transparent electrodes after spraying polyethylene glycol diacrylate on the glass plate, and the device was obtained by adhering the film and the glass substrate together with pressing.

Embodiment 5

Two glass substrates having ITO transparent electrodes were prepared, and 3% by weight solution of PIQ in NMP was rotationally coated (3,000 rpm/minute) on the transparent electrode side of the glass substrate. After baked at 250° C. for 1 hour, polymer film for liquid crystal alignment control was prepared by rubbing the film in a direction using buffs.

Polyethylene terephthalate film of 40 $\mu$m thick was prepared, and the polymer film for liquid crystal alignment control was formed by the above described method on both sides of the polyethylene terephthalate film. Direction of the rubbing was so selected that the direction on both sides crossed over orthogonally each other, and special caution was taken not to harm opposite side plane when rubbing of one side plane was performed.

Glass fiber pulverized in a mortar with particle size 10 $\mu$m was dispersed in an adequate volume of isopropyl alcohol, and was applied on the substrates with a spinner. The above described polyethylene terephthalate film having the polymer film for liquid crystal alignment control was held between two of the glass substrates, and the periphery except inlet of the liquid crystal was sealed with sealant. At the time, larger film than the substrate was used, and the assembling was performed with pulling to all directions in order to avoid bending after the assembling. Further, the rubbing direction was so determined that facing of the glass substrate side and the film side became parallel.

After solidifying of the sealant, dichroic nematic liquid crystal LHA-031B (made by Mitsubishi Chemicals Co.) was put in and enclosed in vacuo.

To the devices obtained by the embodiment from 1 to 5, voltage having rectangular wave of 1 kHz was applied, and transmittance of the light was measured. The composition for the embodiment 1 to 4 was basically illustrated in FIG. 1, and the composition for the embodiment 5 was illustrated in FIG. 7. The measurement was performed with transmitted light. The results of the measurement is indicated in Table 2.

The results indicated in Table 2 reveals that, in accordance with the present invention, the liquid crystal display device having high transmittance at the bright state and high display contrast can be obtained.

TABLE 2

|  | Transmittance at bright state | Contrast ratio |
|---|---|---|
| Embodiment 1 | 62% | 8:1 |
| Embodiment 2 | 55% | 8:1 |
| Embodiment 3 | 58% | 10:1 |
| Embodiment 4 | 52% | 8:1 |
| Embodiment 5 | 65% | 12:1 |
| TN device | 45% | 8:1 |
| TN device | 40% | 20:1 |

In accordance with the present invention, eye-tireless reflection type display can be provided as the bright display is realized.

And, as consuming electric power is low because back light is not necessarily required life time can be remarkably increased when the device is applied to a portable personal computer, and a word processor etc.

Further, when the device is applied as a light bulb for a projection type display, life of the lamp can be extended and electric power consumption can be saved.

What is claimed is:

1. A liquid crystal display device characterized in: comprising;
   a set of substrates faced each other at least one of which is transparent,
   transparent electrodes provided respectively to each facing plane of said substrates,
   a light absorbing layer held between said transparent electrodes, and
   an electric power source for applying electric field to said light absorbing layer through said transparent electrodes, and that;
   said light absorbing layer is composed of two layers, each of the layers has dichroism,
   average light absorbing axis of the each layers without electric field is approximately parallel to the substrate plane and crossing each other almost orthogonally, and
   said average light absorbing axis of the each layers changes the axis direction by applying of electric field.

2. A liquid crystal display device characterized in: comprising;
   a set of substrates faced each other at least one of which is transparent,
   transparent electrodes provided respectively to each facing plane of said substrates,
   a light absorbing layer held between said transparent electrodes, and
   an electric power source for applying electric field to said light absorbing layer through said transparent electrodes, and that;
   said light absorbing layer is composed of two layers, each of the layers has dichroism,
   average light absorbing axis of the each layers without electric field is approximately parallel to the substrate plane and crossing each other almost orthogonally,
   the one of said light absorbing layers is composed of polymer layer and liquid crystal, that is, nematic liquid crystal having dichroism and positive dielectric anisotropy is dispersed in transparent polymer matrix, and
   the other light absorbing layer is a nematic liquid crystal layer surrounded with seal members and having dichroism and positive dielectric anisotropy.

3. The liquid crystal display device as claimed in claim 2, wherein;
   the contacting portion of said polymer layer with said liquid crystal layer and the portion of said transparent electrode formed plane of said liquid crystal layer have alignment control layer for orientation of said liquid crystal parallel of same direction or reverse direction, and
   the alignment of said liquid crystal layer is directed approximately in same direction or reverse direction.

4. A liquid crystal display device characterized in: comprising;
   a set of substrates faced each other at least one of which is transparent,
   transparent electrodes provided respectively to each facing plane of said substrates, and
   a polymer layer held between said transparent electrodes, and that;
   said polymer layer is composed of two layers, each of the layers is composed of nematic liquid crystal particles having dichroism and positive dielectric anisotropy dispersed in transparent polymer matrix,
   said nematic liquid crystals in each of said layers are aligned approximately parallel to the plane of said substrate in a specific orientation, and
   the orientation of the alignment of said two layers are so determined as to cross over each other almost orthogonally.

5. The liquid crystal display device as claimed in any one of claims from 2 to 4, wherein;
   the relationship, $n_o \leq n \leq n_e$, is established among the refractive indexes, $n_o$ and $n_e$, of said nematic liquid crystal to ordinary light and extraordinary light and the refractive index, $n_p$, of the polymer matrix.

6. The liquid crystal display device as claimed in any one of claims from 2 to 4, wherein;
   anisotropy of refractive index $\Delta n$ ($= n_e - n_o$) of said nematic liquid crystal is at most 0.1.

7. The liquid crystal display device as claimed in any one of claims from 2 to 4, wherein;
   said transparent polymer matrix is stretched uniaxially.

8. The liquid crystal display device as claimed in any one of claims from 2 to 4, wherein;
   said transparent polymer matrix is liquid crystalline polymer.

9. The liquid crystal display device as claimed in any one of claims from 1 to 4, wherein;
   said light absorbing layer is transparent polymer matrix in which nematic liquid crystal is dispersed particlewise, and
   average particle size of said nematic liquid crystal is at least 1 μm.

10. The liquid crystal display device as claimed in any one of claims from 2 to 4, wherein;
    thickness of said transparent polymer layer is at most 30 μm.

11. A liquid crystal display device characterized in: comprising;

a set of substrates faced each other at least one of which is transparent, transparent electrodes provided respectively to each facing plane of said substrates, liquid crystal alignment control layers provided on said transparent electrodes, two liquid crystal layers separated by a polymer layer and held between said set of substrates, thickness of said polymer is at most 10 times of the the thickness of said liquid crystal layers and seal portions surrounding vicinity of said liquid crystal layer, and that;

said liquid crystal layer is nematic liquid crystal having dichroism and positive dielectric anisotropy, said nematic liquid crystal is approximately parallel to the substrate plane and is aligned to a designated orientation, and the orientation of alignment in said two layers of liquid crystal layers are crossing each other almost orthogonally.

12. The liquid crystal display device as claimed in claim 11, wherein;

said liquid crystal is nematic liquid crystal including dichromatic dye.

13. The liquid crystal display device as claimed in claim 11, wherein;

liquid crystal alignment control layers are formed on both sides of said polymer layer, orientating direction of alignment of said liquid crystal alignment control layers on both sides mutually cross over almost orthogonally and are approximately parallel or reverse parallel to orientating direction of the alignment formed in said liquid crystal alignment control layer at opposite side beyond said liquid crystal layer.

14. The liquid crystal display device as claimed in claim 11, wherein;

said polymer layer has double structure comprising polymer materials which are stretched uniaxially, said stretched directions mutually cross over almost orthogonally, and orientating direction of the alignment formed in said liquid crystal alignment control layer at opposite side beyond said liquid crystal layer approximately coincides with the stretched direction.

15. The liquid crystal display device as claimed in claim 11, wherein;

thickness of said two layers of liquid crystal are approximately equal.

16. The liquid crystal display device as claimed in any one of claims 1, 2, 4, and 11, wherein;

transistors are formed on one of transparent electrodes formed on said substrates.

17. The liquid crystal display device as claimed in any one of claims 1, 2, 4, and 11, wherein;

a reflector is provided outside of said substrates.

18. A projection type display apparatus comprising;

a white light source, dichroic mirrors for dividing white light outgoing from said white light source into three primary colors, elements for forming images by being driven and controlled in accordance with external signal of designated light divided by said mirrors, mirrors for reflecting image light passing through said elements, and lenses for projection of said reflected images mirrors to a screen, characterized in that;

said elements are liquid crystal display devices comprising;

a set of substrates faced each other at least one of which is transparent, transparent electrodes provided respectively to each facing plane of said substrates, a light absorbing layer held between said transparent electrodes, and an electric power source for applying electric field to said light absorbing layer through said transparent electrodes, in which;

said light absorbing layer is composed of two layers, each of the layers has dichroism, average light absorbing axis of the each layers without electric field is approximately parallel to the substrate plane and crossing each other almost orthogonally, and said average light absorbing axis of the each layers changes the axis direction by applying of electric field.

19. A display apparatus characterized in having:

a liquid crystal display device comprising;

a set of substrates faced each other at least one of which is transparent, transparent electrodes provided respectively to each facing plane of said substrates, a light absorbing layer held between said transparent electrodes, and an electric power source for applying electric field to said light absorbing layer through said transparent electrodes, in which said light absorbing layer is composed of two layers, each of the layers has dichroism, average light absorbing axis of the each layers without electric field is approximately parallel to the substrate plane and crossing each other almost orthogonally, and said average light absorbing axis of the each layers changes the axis direction by applying of electric field, and a matrix electrode as said transparent electrode for operation of said display device.

* * * * *